US008756663B1

(12) United States Patent
Taglienti et al.

(10) Patent No.: US 8,756,663 B1
(45) Date of Patent: *Jun. 17, 2014

(54) SERVICE UTILIZATION CONTROL MANAGER

(71) Applicant: United States Cellular Corporation, Chicago, IL (US)

(72) Inventors: Claudio Taglienti, Barrington Hills, IL (US); Andrew Sofronas, Kildeer, IL (US); Jaideep Abichandani, Carol Stream, IL (US); Narothum Saxena, Hoffman Estates, IL (US); Michael Shannon Irizarry, Algonquin, IL (US)

(73) Assignee: United States Cellular Corporation, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,359

(22) Filed: Aug. 5, 2013

Related U.S. Application Data

(63) Continuation of application No. 11/967,909, filed on Dec. 31, 2007, now Pat. No. 8,505,073.

(51) Int. Cl.
*H04L 29/06* (2006.01)
*H04W 28/16* (2009.01)

(52) U.S. Cl.
CPC ............. *H04W 28/16* (2013.01); *H04L 63/102* (2013.01); *H04L 65/1069* (2013.01)
USPC ............... 726/4; 455/405; 455/406; 455/407; 455/414.3; 455/425

(58) Field of Classification Search
CPC ..... H04L 63/102; H04W 12/08; H04W 28/16
USPC ............................................................. 726/4
See application file for complete search history.

(56) References Cited

U.S. PATENT DOCUMENTS

| 2002/0068545 | A1 * | 6/2002 | Oyama et al. | 455/406 |
|---|---|---|---|---|
| 2004/0102182 | A1 * | 5/2004 | Reith et al. | 455/410 |
| 2006/0046714 | A1 * | 3/2006 | Kalavade | 455/428 |

OTHER PUBLICATIONS

Kim, Sang-ki, Modeling of policy-based mobile payment, Feb. 2004, The 6th International Conference of Advanced Communication Technology, vol. 2, pp. 1009-1011.*

* cited by examiner

*Primary Examiner* — Morshed Mehedi
*Assistant Examiner* — Kenneth Chang
(74) *Attorney, Agent, or Firm* — Leydig, Voit & Mayer, Ltd.

(57) ABSTRACT

An apparatus is described for managing mobile network services. The apparatus includes a service authorization and utilization control function (SAUCF) element configured to authorize a mobile network service request by acting as a service manager configured to centrally coordinate service authorizations for multiple network services associated with an individual subscriber account by evaluating a service policy defining user access spanning the multiple network services. The service policy includes (a) communication authorization controls affecting permission for a user associated with the subscriber account to access a mobile network service in accordance with one or more criteria applicable to a bundled service category; and (b) charging controls for determining whether a subscriber account includes sufficient credits to use the mobile network service. A real time utilization interface is configured to transmit messages between the SAUCF element and a subscriber service utilization account.

17 Claims, 13 Drawing Sheets

SERVICE UTILIZATION CONTROL MANAGER

This patent application is a continuation of U.S. application Ser. No. 11/967,909, filed Dec. 31, 2007, entitled "Service Utilization Control Manager," the contents of which are expressly incorporated herein by reference in there entirety, including any references therein.

BACKGROUND OF THE INVENTION

Mobile networks have evolved such that 3rd generation mobile networks offer many different services that include multimedia messaging, streaming video, parental control, and mobile phone advertisements. The IP Multimedia Subsystem (IMS) is an architectural framework for delivering internet protocol (IP) multimedia to mobile users. The 3GPP developed IMS to evolve mobile networks beyond GSM. IMS allows service providers to deliver Internet services over a variety of networks that include, but are not limited to, GPRS, Wireless LAN, CDMA2000, and fixed line.

To ease the integration with the Internet, IMS uses Internet protocols such as Session Initiation Protocol (SIP). The purpose of IMS is to aid access of multimedia and voice applications across wireless and wireline terminals. This is done by having a service plane and a bearer plane. The service plane provides different services to wireless terminals across wireless networks. Alternatively, the bearer plane allocates the physical network recourses (i.e. network bandwidth) necessary to provide the services provisioned by the service plane. Further, IMS has allowed Application Servers to apply policies for certain applications to the bearer plane via a functional element known as the Policy and Charging Rules Function (PCRF). The policy framework defined in IMS, for example, allows a subscriber to receive appropriate bandwidth and reductions in latency for viewing of a streaming video (service application). The IMS and MMD standards define how the PCRF is used by application servers (AS) to push or pull policy information about how a user is to use the resources provided by the bearer plane (RF and IP resources at the access network).

BRIEF SUMMARY OF THE INVENTION

Aspects of the invention allow mobile network users as well as mobile network providers to define policies that are managed across several applications and services. Thus, several application servers and network elements are coordinated to implement a service policy. More specifically, aspects of the invention define service level policies for any service be within an IMS based or non-IMS based wireless network implemented by SIP or non-SIP network elements.

A service policy is a set of rules that is applied when a subscriber uses a specific service (Web Browsing, Location, Presence, MMS, SMS, PoC, etc). The policy may be applicable on a per-need, per-subscriber basis. A service policy enhances or restricts use of the service functionality by the subscriber. In addition, a service level policy allows definition of service utilization rules that constrain how the service may be used by a subscriber. For example, a parent may restrict the use of her child's cell phone to only one hour per day between the time of 12 noon to 1 pm and 4 pm to 6 pm. Thus, aspects of the inventions allow mobile service subscribers to receive a level of customization for services rendered by a mobile network service provider. Further, mobile network service providers may provide not only custom service to subscribers but also simplifies the provisioning by allowing a single-point of configuration for subscriber based service control policies. Consequently, service level policies have wider scope than bearer level policies such as quality of service in the form of on-demand bandwidth, committed rates of throughput, committed reduction in delay/jitter/latency.

BRIEF DESCRIPTION OF THE SEVERAL VIEWS OF THE DRAWING(S)

DETAILED DESCRIPTION OF THE INVENTION

The following examples further illustrate the invention but, of course, should not be construed as in any way limiting its scope.

Figure 1:
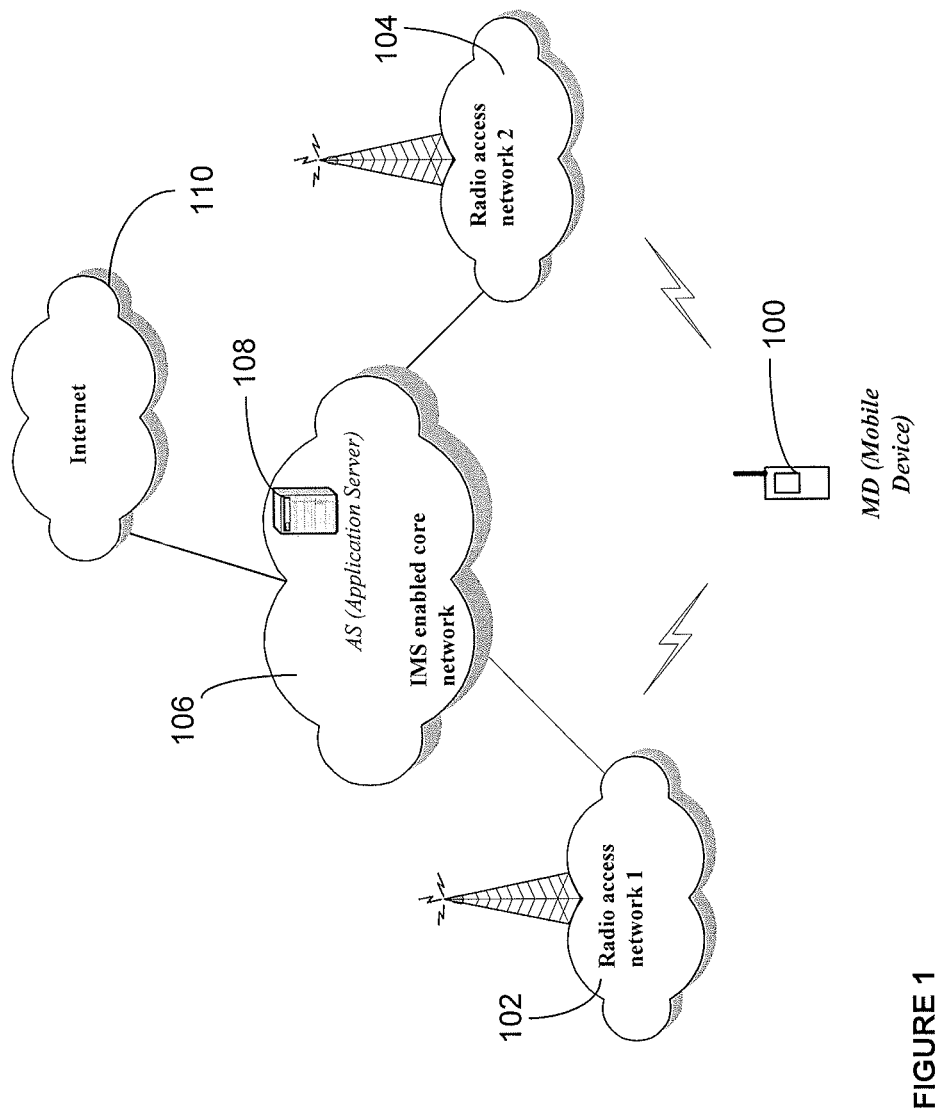
FIG. 1 is a schematic diagram illustrating an exemplary IMS network environment, wherein a mobile device communicates with an application server located in an IMS core network via one or more access networks, as contemplated by an embodiment of the present invention.

FIG. 1 is an exemplary implementation of a system contemplated by an aspect of the invention is shown with reference to an IP multimedia network environment with an IMS enabled core. Note that aspects of the invention are not limited to the type of network depicted in FIG. 1, but may include other non-IMS networks. FIG. 1 shows one exemplary environment where mobile services are managed on a per subscriber basis. In this aspect, a user device 100 is a mobile device, such as a wireless telephone or a portable computer capable of wireless communication with a plurality of radio access networks (102, 104), such as those employing a CDMA-based, GSM-based, or a WCDMA-based standard.

To enhance the user experience with multimedia based services, the access networks (102, 104) are connected to an IP Multimedia Subsystem (IMS) core network 106 that manages IP network sessions in a mobile environment. The IMS core network 106 further includes an application server (AS) 108, which hosts one or more applications available to the mobile device 100. The applications hosted by AS 108 include multimedia applications, such as streaming media applications, as well as other applications which require the maintenance of specific quality of service (QoS) guarantees.

To expand the variety of applications available to the mobile device 100 via the access networks (102, 104), the IMS core network 106 includes a connection to the public Internet 110. Preferably, the mobile device 100 is a multi-mode entity capable of accessing a plurality of access networks operating based on different network technologies. Examples of a mobile device include but not limited to a mobile phone, Personal Digital Assistant (PDA), and a laptop computer.

Figure 2:
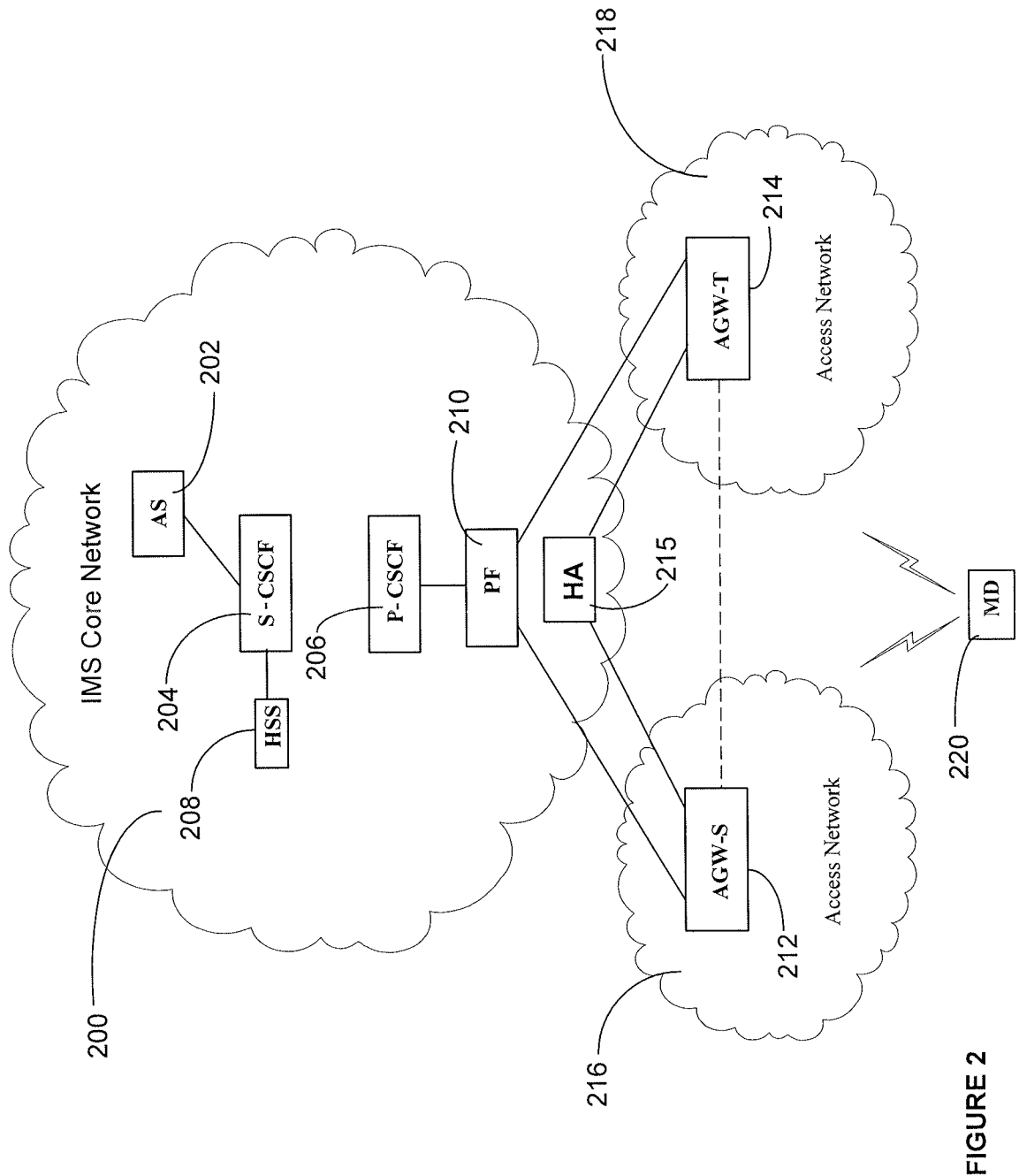
FIG. 2 is a schematic diagram illustrating an exemplary implementation of the IMS core network and access networks of FIG. 1 in more detail, in accordance with an embodiment of the invention.

FIG. 2 illustrates an exemplary implementation of the IMS core network 200 and access networks (216, 218) of FIG. 1 in more detail. The mobile device 220 and the application server 202 communicate via access networks (216, 218) and the IMS core network 200 to establish and maintain a service session for an application launched by a user. In addition to the application server 202, the IMS core network 200 includes other IMS functions, such as those described in G. Camarillo, M. Garcia-Martin, "The 3G IP Multimedia Subsystem (IMS) Merging The Internet And The Cellular Worlds," John Wiley & Sons, Ltd., 2006 (second edition), which is incorporated herein by reference in its entirety for everything that it teaches. To this end, the AS 202 is connected to a Serving Call/Session Control Function (S-CSCF) 204, which is a Session Initiation Protocol (SIP) server that performs session control, SIP registrar, authentication, and other IMS functions via SIP protocol signaling described in J. Rosenberg, H. Schulzrinne, G. Camarillo, A. Johnston, J. Peterson, R. Sparks, M. Handley, E. Schooler, "SIP: Session Initiation Protocol," RFC 3261, IETF, June 2002, which is incorporated herein by reference in its entirety for everything that it teaches. The IMS core network 200 includes a number S-CSCFs, wherein each S-CSCF has a certain capacity in terms of a maximum number of supported mobile devices (MD) 220.

The S-CSCF 204, in turn, connects to a Proxy Call/Session Control Function (P-CSCF) 206, which, among other IMS functions, includes user authentication functions and acts as an inbound and outbound SIP proxy server by relaying the SIP requests and responses to and from the mobile device 220 and to and from the IMS core network 200. As with the S-CSCF 204, the IMS core network 200 includes a number of P-CSCFs, wherein each P-CSCF has a certain capacity of being able to support a predefined number of mobile devices 220. The Home Subscriber Server (HSS) 208 is a database of user-related information and contains user subscription data necessary for authentication and authorization of an IP multimedia session associated with a given application. The HSS serves the S-CSCF as shown in FIG. 2. The user subscription data is contained in a user profile that indicates, among other things, the types of services to which the user subscribes. Additionally, a Policy Function (PF) 210 This in the MMD (3GPP2 specs) is the "Policy and Charging Rule Function (PCRF) is used to authorize the media plane resources and supervise the QoS over the media plane by interfacing with a plurality of Access Gateways (212, 214), which, in turn, allocate the access network resources within the corresponding access networks (216, 218) in accordance with the QoS constraints required by the multimedia application. Note that the PF 210 is analogous to the Policy and Charging Rule Function (PCRF) in an MMD network architecture. Finally, the Home Agent (HA) 215 is a router typically involved in the Mobile IP (MIP) session registration process, as well as in tunneling of packets when the MD 220 is roaming.

Figure 3:
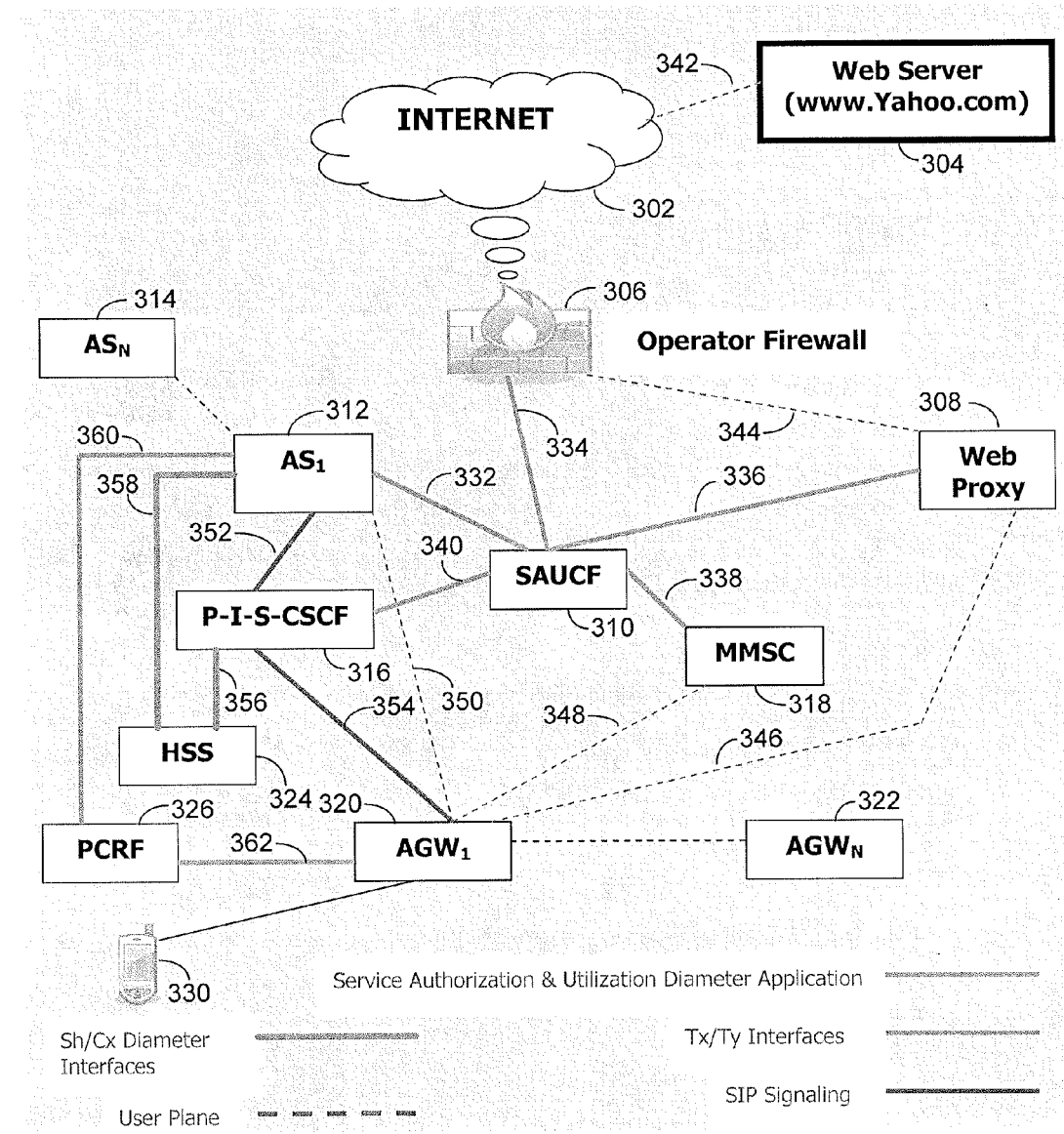
FIG. 3 illustrates an exemplary implementation of a service policy authorization and utilization control function (SAUCF) that applies a service policy across several applications and services interacting with IMS and non-IMS network elements.

FIG. 3 illustrates an exemplary implementation of a service policy authorization and utilization control function (SAUCF) 310 that applies a service policy across several applications and services interacting with IMS and non-IMS network elements. Generally, FIG. 3 shows a SAUCF interfacing with different network elements in the context of an IMS network. IMS application servers ($AS_1$-$AS_n$) (312, 314) and the CSCF 316 utilize the services of the SAUCF 310 via the unique Service Authorization & Utilization Diameter Application (SAUDA) interface. The S-CSCF 316 plays an important part in Voice over IP calls because all calls for a given subscriber traverse the S-CSCF 316. When no AS (312-314) is involved in a VOIP call, the S-CSCF 316 may request service level policies for a subscriber from the SAUCF. FIG. 3 also shows legacy (non-IMS) application servers such as the MMSC 318 and a Web Proxy 308. Legacy network elements also utilize the Service Authorization & Utilization Diameter Application interface to the SAUCF 310 to support service level policies. Finally, the services provided by the SAUCF 310 may be utilized by network elements other than application servers. For example, FIG. 3 shows a firewall 306 communicating with the SAUCF 310 that may provide restriction or privacy services to a subscriber. Note that interfaces 332-340 carry the Service Authorization and Utilization Diameter Application.

FIG. 3 also shows network elements and functions shown in FIG. 2 that include the PCRF 326 and HSS 324. The SAUCF also enforces subscriber level policies for access to the Web Servers 304 through the Internet 302 across a firewall 306. Further, the CSCF 316 routes signaling for subscribers services to one or more mobile devices 330 through a plurality of Access Gateways (320-322). Note that interfaces 344-350 are on the User Plane and carry the data between the mobile and the servers (client-server) and or other mobiles (peer-to-peer). Interfaces 360-362 are Tx/Ty interfaces while interfaces 356-358 are Sh/Cx Diameter interfaces. In addition, interfaces 352-354 are SIP Signaling interfaces.

Figure 4:
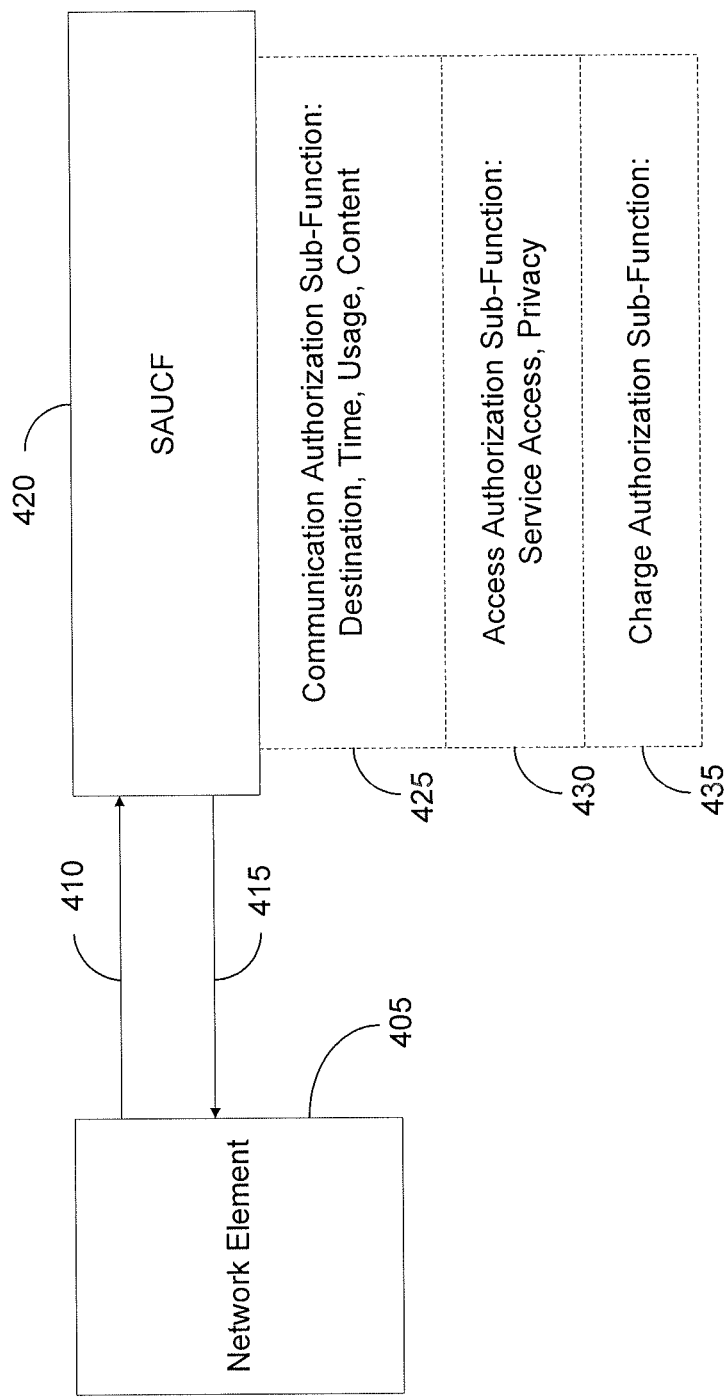
FIG. 4 illustrates the details in an exemplary process of requesting authorization by an Network Element to a SAUCF.

FIG. 4 illustrates the details in an exemplary process of requesting authorization by a Network Element 405 to a SAUCF 420. A Network Element (i.e. application server, firewall, etc.) 405 requests service authorization 410 from a SAUCF 420. An SAUCF 420 may have several sub-functions that may include a Communication Authorization Sub-Function 425, Access Authorization Sub-Function 430, and a Charge Sub-Function 435. Communication Authorization Sub-Function may include restrictions to certain members of a subscriber in terms of their call destination, calling minutes (time), usage, and content. For example, a family subscriber group may restrict a son's call destination to only his parents' mobile phones. Access Authorization Sub-Functions may include service access and privacy controls to certain members of a subscriber group. For example, a subscriber group may elect not to disclose to advertisers personal subscriber information for coupons on advertiser products and services. Charge Authorization Sub-Function checks the subscriber account to ensure that there are credits available to the subscriber use the requested service. The SAUCF Charging Authorization Sub-Function is used when a charging discount is applicable based on the fact that the subscriber is communicating (any form of communication) with members of the "trusted group." For other forms of charging that do not involve the "trusted group" the SAUCF defers to the Online Charging System (See FIG. 5). After the SAUCF 420 determines whether to deny or authorize the requested service by the Network Element 405, it sends a Service Authorization or Denial message 415 to the Network Element 405.

Figure 5:
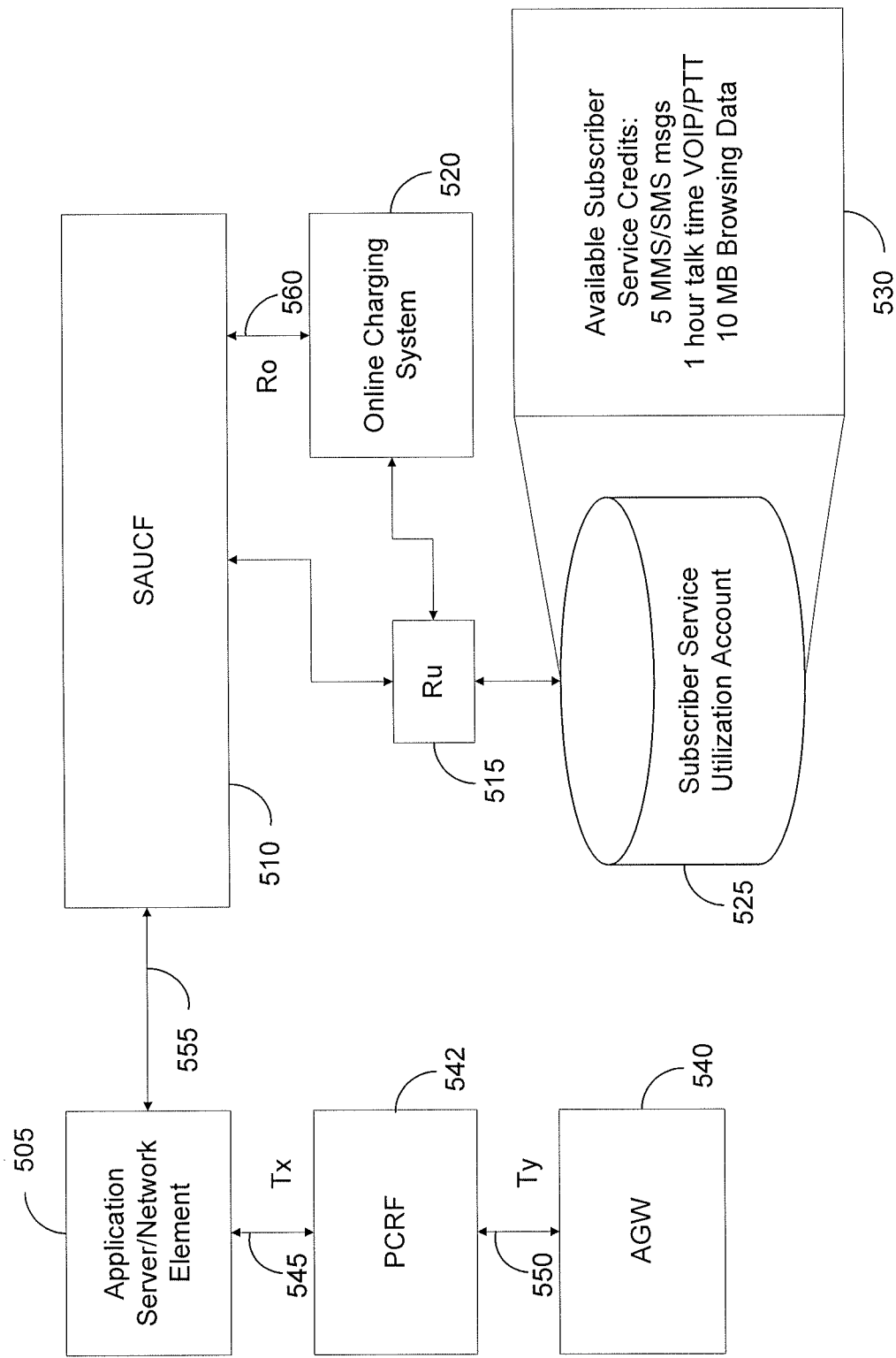
FIG. 5 illustrates an exemplary implementation of a SAUCF in network.

FIG. 5 illustrates an exemplary implementation of a SAUCF in network. FIG. 5 shows two novel interfaces 555 and 515 and a unique subscriber specific data store with respect to managing mobile services on a subscriber basis. Note that the SAUCF may be implemented in any network element such as, but not limited to an AAA or a HSS. However, the SAUCF may also be implemented as a separate entity. The SAUCF 510 acts as a service manager for all services in the network between network elements for a subscriber group. With respect to the On Line Charging System (OCS) 520 the SAUCF may act as a charging proxy. Authorization requests 555 are sent by any network element (such as an application server) 505 to the SAUCF 510. In addition, authorization requests may utilize the new "Service Authorization & Utilization Diameter Application" interface with Attribute Value Pair commands (AVPs) that will be described later in this specification. Charging based authorization requests may also be made by network elements as Credit Control Request (CCR) AVPs to describe the way a service is charged. In certain aspects of the invention, the SAUCF supports RFC 4006 (CCR/CCA) because the SAUCF may proxy for the OCS. The SAUCF 510 may pass charging requests to the OCS 520 in the form of a CCR Diameter messages. The SAUCF 510 may apply "trusted groups" discounts for subscribers that qualify. Trusted groups will be described in more details later in this specification.

FIG. 5 also shows an application server 505 that communicates with a PCRF 542 across a Tx interface 545 and a PCRF 542 that communicates to an access gateway across a Ty interface 550. Alternatively, the SAUCF 510 uses a Ru interface 615 and bypasses the OCS 520 for network elements that do not require charging authorization but require service level utilization authorization. The Ru interface 515 maps authorization messages 555 to service utilization messages sent to a Subscriber Service Utilization Account 525. The OCS 520 communicates with the SAUCF 510 across a standard IMS Ro interface 560.

The Ru interface 515 may use a modified Diameter application where the Diameter protocol is defined in RFC 3588. The Diameter Ru interface allows network elements to query the service usage credit balance for a given subscriber from the Subscriber Service Utilization Account 525 and provide the ability to withdraw and deposit into the balance. The "Subscriber Service Utilization Account" 525 allows definition of service utilization "buckets" based on "bundled services". For instance, a "message bundled service" bucket for a subscriber has defined the category "messages" as MMS and SMS. FIG. 5 also shows exemplary available subscriber service credits 530. For example, the subscriber has service credits equal to 5 MMS/SMS messages, one hour of talk time using VOIP/PTT, and 10 MB of Browsing data.

Figure 6:
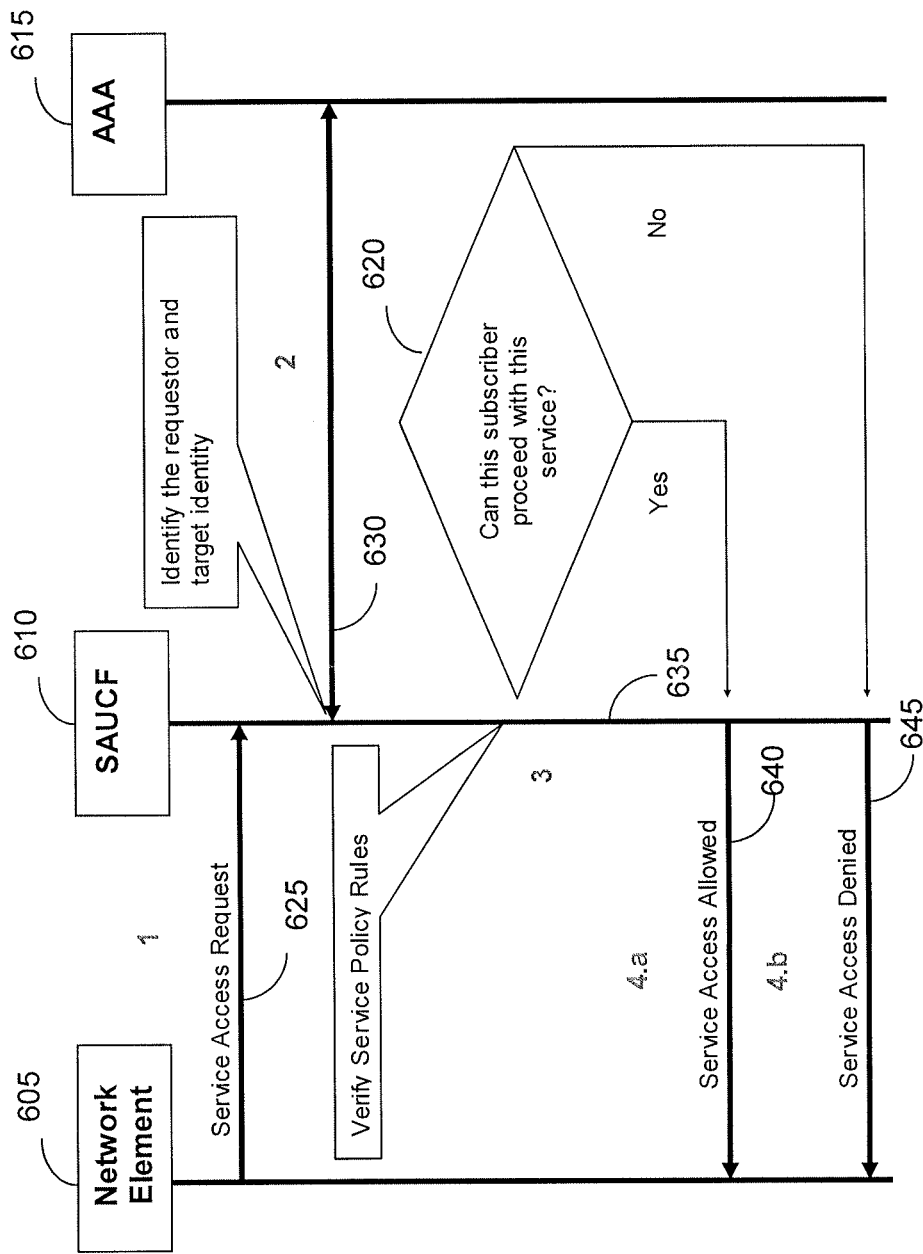
FIG. 6 is an exemplary SAUCF High Level Message flow chart.

FIG. 6 is an exemplary SAUCF High Level Message flow chart. The Service Authorization and Utilization Control Function (SAUCF) 610 becomes a repository of subscriber service level policies. These policies are defined in Policy Decision Points such as the SAUCF 610 and enforced via Policy Enforcement Points such as an Application Server or Application Policy Function (network Element 605).

SAUCF implements policies designed by a subscriber or subscriber group with regard to services provided to a subset of subscribers within a subscriber group. For example, a SAUCF incorporates a parental control service into its policy for a subscriber group. The parental controls include restricting all communication by children to only members of the family (father or mother). Further, parents may restrict their children to only 10 MMS or SMS messages per day between noon and 1 pm and 4 pm-6 pm. In addition parents may restrict children to voice services (such as VOIP or PTT) to only between noon and 1 pm and 4 pm-6 pm.

The SAUCF service policy may also contain rules for providing advertising services to a subscriber. For example, a subscriber may opt in for discounts or refunds by allowing reception of advertisement messages. For example, no more than 10 advertisement messages (MMS or SMS) per month. Further, SAUCF service policy may also contain rules for subscriber privacy. For example, a subscriber may opt in to disclose personal information to advertisers for a coupon/discount for given products. Subscriber may only allow no more than 10 personal location fixes or presence updates per month. In addition, the SAUCF may incorporate family charging services into its service policy for subscriber group. For example, all communication among members of the family is free, or all messages (MMS and SMS) send to members of the family is 50% off during evening hours.

As shown in FIG. 6, a first step is to determine if a subscriber is authorized to use a service is to send a "Service Access Request" message 625 to the SAUCF 610. The network element 605 may use a Diameter protocol via a modified Diameter Application, namely a "Service Authorization & Utilization Diameter Application". This modified diameter application is defined with a diameter application ID assigned by the Internet Assigned Numbers Authority (IANA). This Diameter application defines a set of additional attribute-value pairs (AVP) commands to describe the set of service policies desired by the subscriber. Table 1 below describes an exemplary set of additional Diameter AVPs that is supported by the Service Authorization & Utilization Diameter Application.

TABLE 1

| Command Name | Parameters | Description |
| --- | --- | --- |
| Communication-Request | | This command requests communication permission between two end points. |
| | Source-Address | This is the IP address associated with the subscriber. |
| | Destination-Address | This is the IP address associated with the destination of any communication originating from the Source-Address. |
| | Content | This can be a "URL" or a Media Type such as Audio and Video. |
| Privacy-Request | | This command requests permission to release to the requestor subscriber (target) specific data. |
| | Requestor | Identity of source of this request. The identity may be but not limited to: SIP-URI, MDN, MIN, Email-Address, IM Address, and NAI. |
| | Target | Identity of target of this request. The identity may be but not limited to: SIP-URI, MDN, MIN, Email-Address, IM Address, and NAI. |

TABLE 1-continued

| Command Name | Parameters | Description |
| --- | --- | --- |
| | Location | Requestor is requesting "Location" information about Target. Location information such as Latitude, Longitude, and Altitude. |
| | Presence | Requestor is requesting "Terminal Status" information about Target. The status may be but not limited to Reachable, Unreachable, and Busy. |
| | Identity | Requestor is requesting personal information about the target. Identity information may be but not limited to Full Name, Full Address, Mobile Phone Number, Email Address, SIP-URI, and IM Address. |
| Service-Authorization-Request | | This command requests permission to use a particular service identified by Service-ID and possibly includes the desired service utilization. |
| | Requestor | Identity of source of this request. The identity may be but not limited to: SIP-URI, MDN, MIN, Email-Address, IM Address, and NAI. |
| | Target-Subscriber | Identity of target of this request. The identity may be: SIP-URI, MDN, MIN, Email-Address, IM Address, and NAI. |
| | Target-Service-Content | URL used to identifies the content of a specific service. |
| | Service-ID | ID identifying the specific service for which authorization is being requested. Example: MMS, LBS, PTT, etc |
| | Utilization-Request-Type | Specifies the type of utilization request. Exemplary session based types may be: Initial-Request Update-Request Final-Request Exemplary event based types may be: One-Time-Event |
| | Requested-Service-Units | Contains the amount "service" units desired by the requestor. For example, for MMS Requested-Service-Units may be the number of MMS messages. Another example may be a VOIP call where the Requested-Service-Units may be the number of minutes of conversation. This parameter forces a response containing the "Granted-Service-Units" AVP which defines the number of service units granted by the SAUCF. |
| | Used-Service-Units | Contains the amount "service" units consumed by the requestor. |
| Identity-Request | | |
| | Subscriber-Address | This is the IP address associated with the subscriber. If this subscriber has a live data session for which the AAA has successfully authenticated this subscriber then the response to this command is the private-identifier known as Network Access Identifier (NAI) corresponding to the subscriber. If no valid session exists for this subscriber then the AAA returns an error code. |
| | Target-Address | This is the IP address associated with the target of the subscriber communication. If this target has a live data session for which the AAA has successfully authenticated this subscriber then the response to this command is the private-identifier known as Network Access Identifier (NAI) corresponding to the target. If no valid session exists for this target subscriber then the AAA returns an error code. |
| Charge-Request | | This command is required for any charge authorization request and may include Credit Control Diameter parameters destined for the On Line Charging System. |

TABLE 1-continued

| Command Name | Parameters | Description |
| --- | --- | --- |
| | Requestor | Identity of source of this request. The identity may be but not limited to: SIP-URI, MDN, MIN, Email-Address, IM Address, and NAI. |
| | Charged-Service-ID | ID identifying the specific service for which charging is being requested. Example: MMS, LBS, PTT, etc. |
| | Any Additional AVPs in Credit Control Application as defined in RFC 4006 "Credit Control Application" | |

As shown in FIG. 6, in a step 1, a "Service Access Request" message is a subset of the Service Authorization & Utilization Diameter Application AVPs defined in Table 1. For example, when the SAUCF receives the Communication-Request AVP, the SAUCF then sends the Authentication, Authorization and Accounting (AAA) server 615 an Identity-Request, in a step 2 630, with the Subscriber-Address and Target-Address set to be the Source-Address and the Destination-Address, respectively. These parameters may have been previously received from a Communication-Request. The AAA 615 determines whether a valid data session exists for this subscriber/target and returns the Network Address Identifier (NAI) that uniquely identifies the subscriber and target to the operator network.

Figure 7:
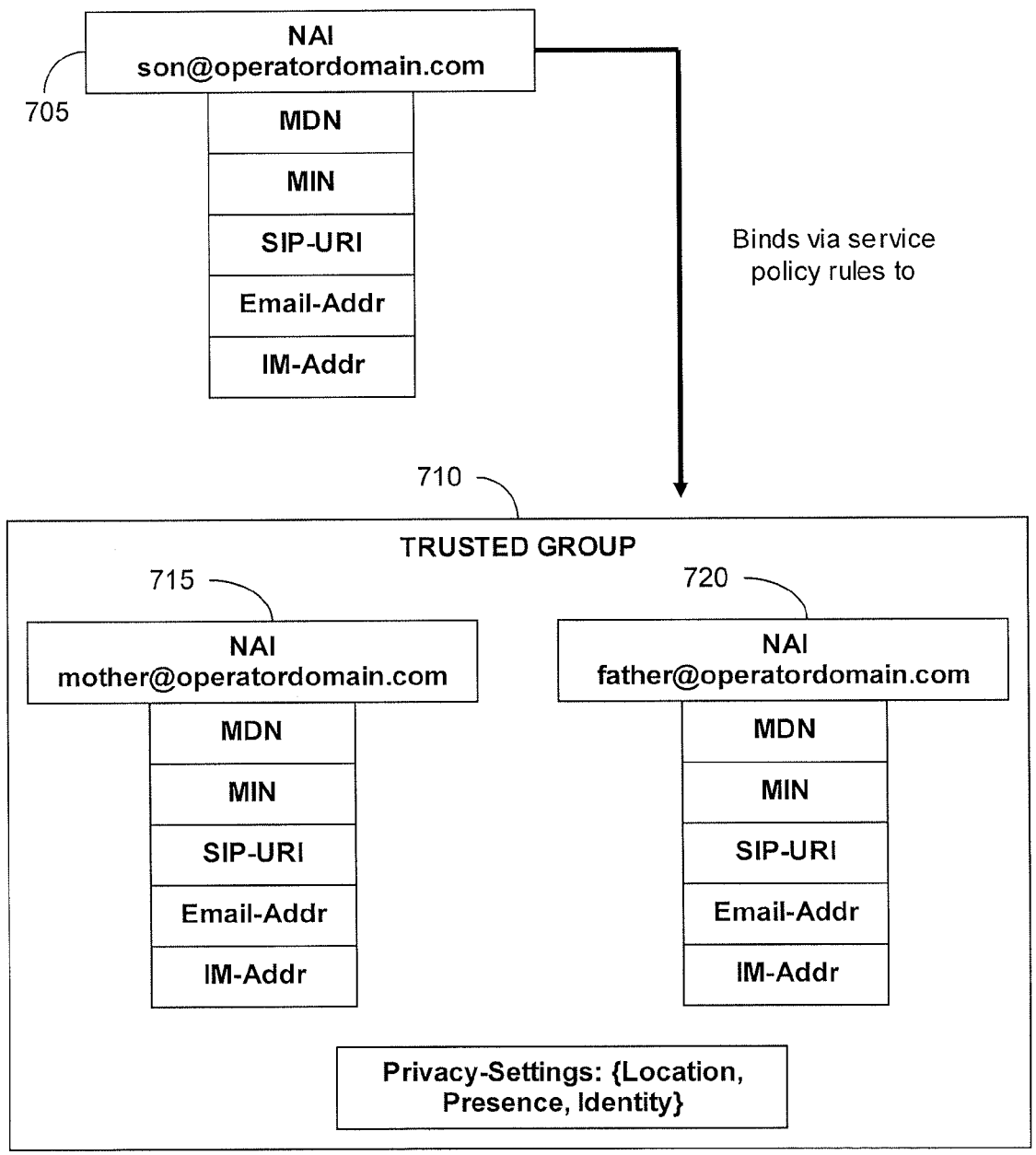
FIG. 7 illustrates an exemplary binding of an individual subscriber to a "trusted group" of subscribers.
Figure 8:
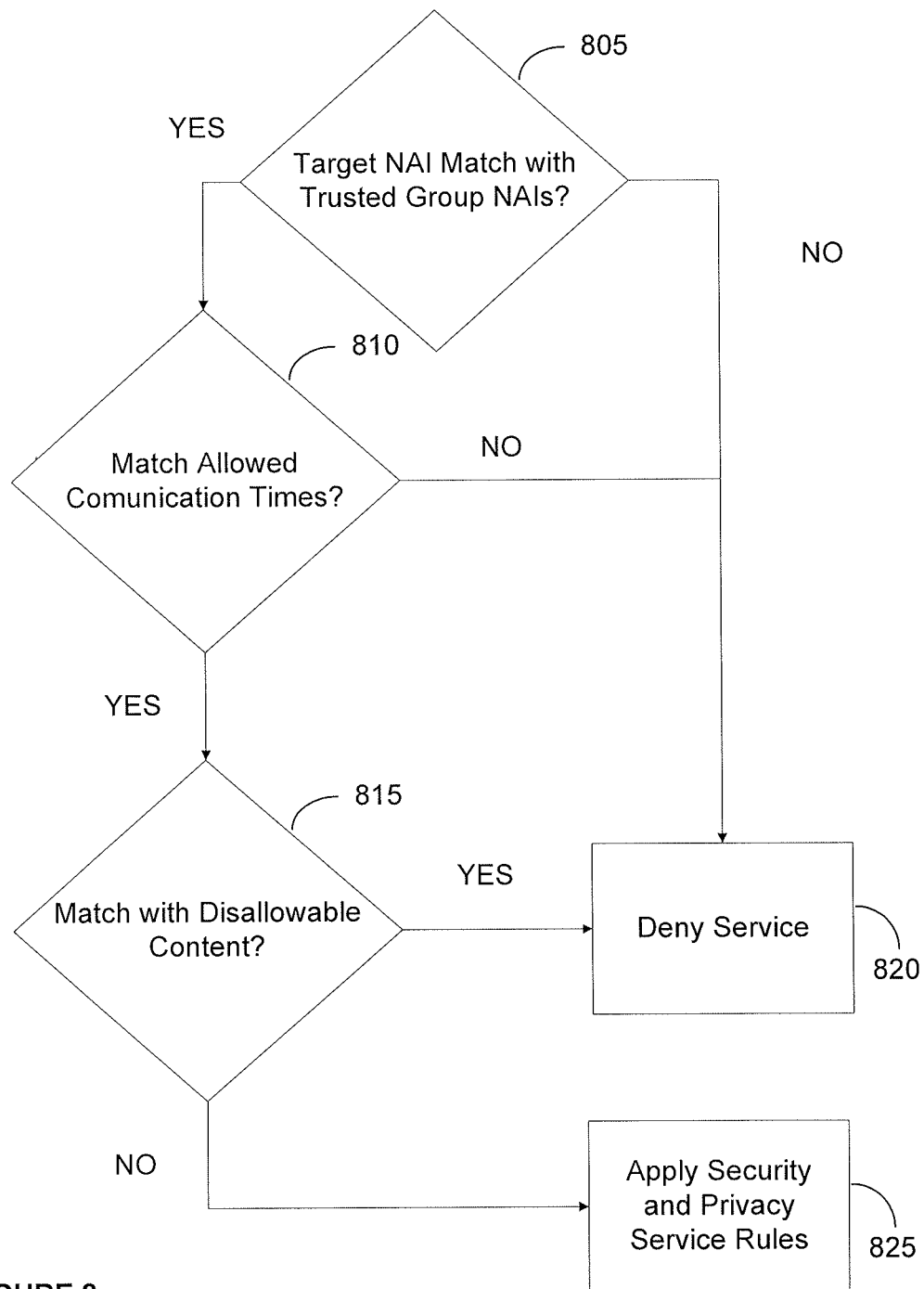
FIGS. 8-11 are flow charts that illustrate an exemplary implementation of service policy rules.
Figure 9:
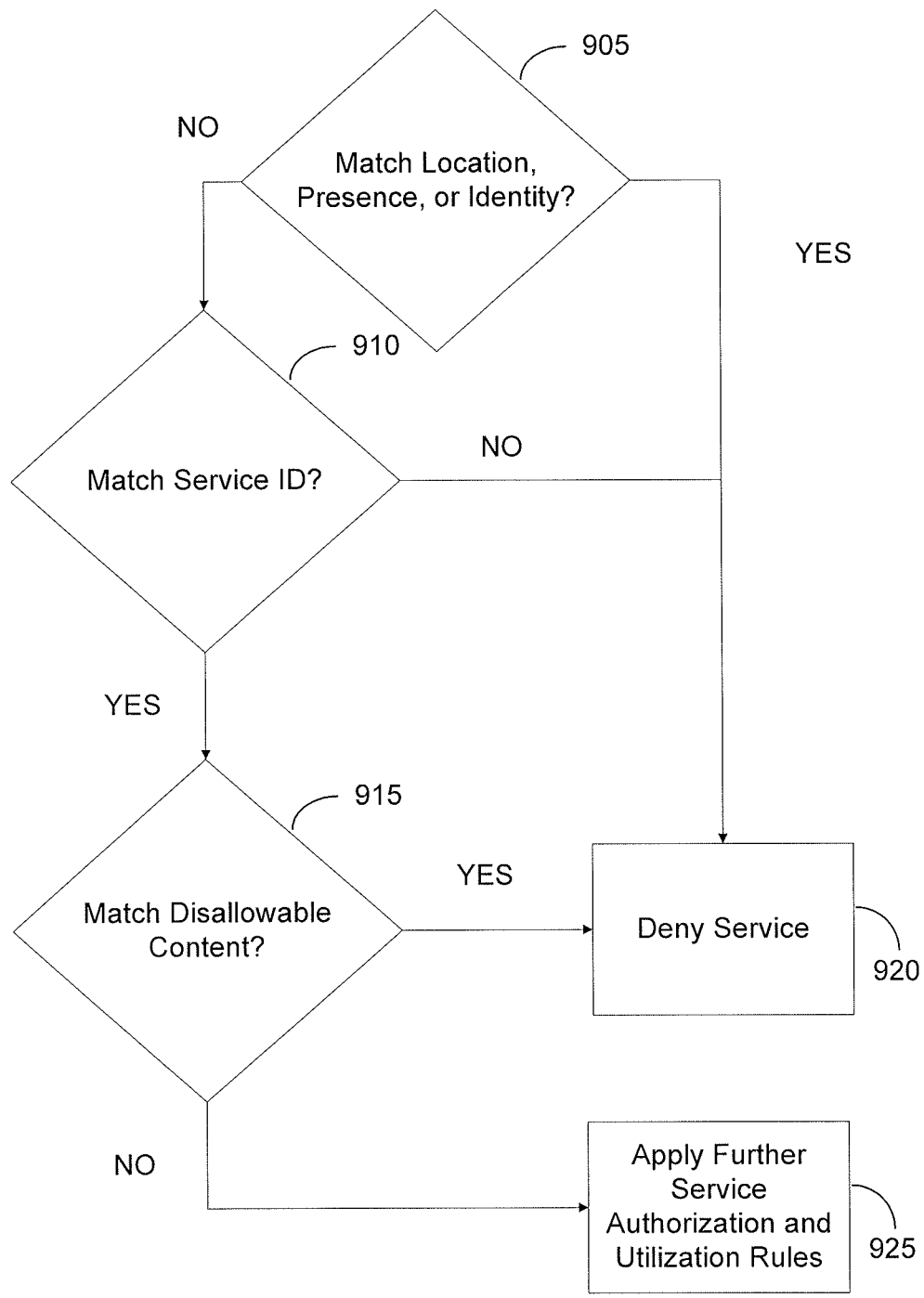
Figure 10:
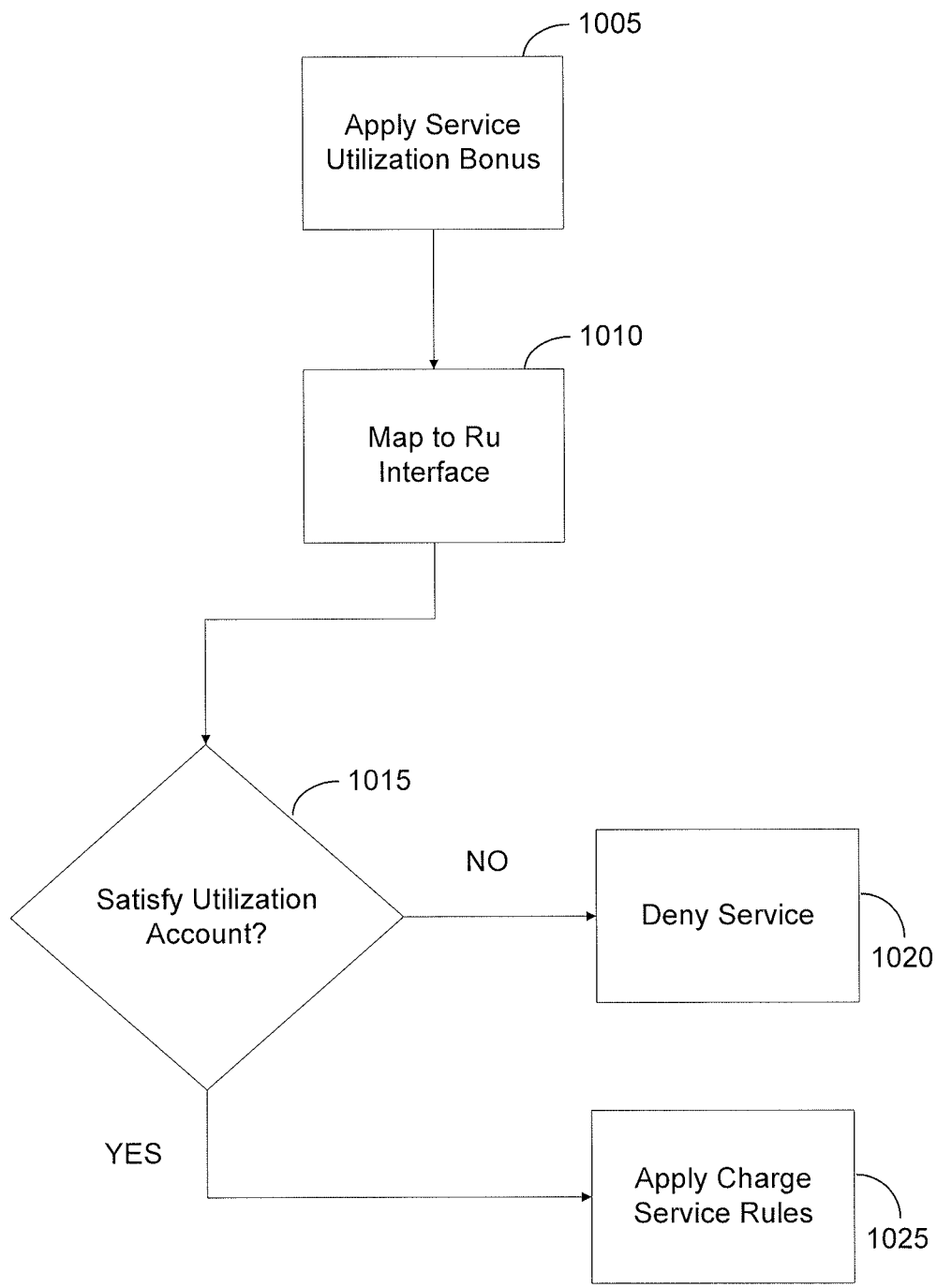
Figure 11:
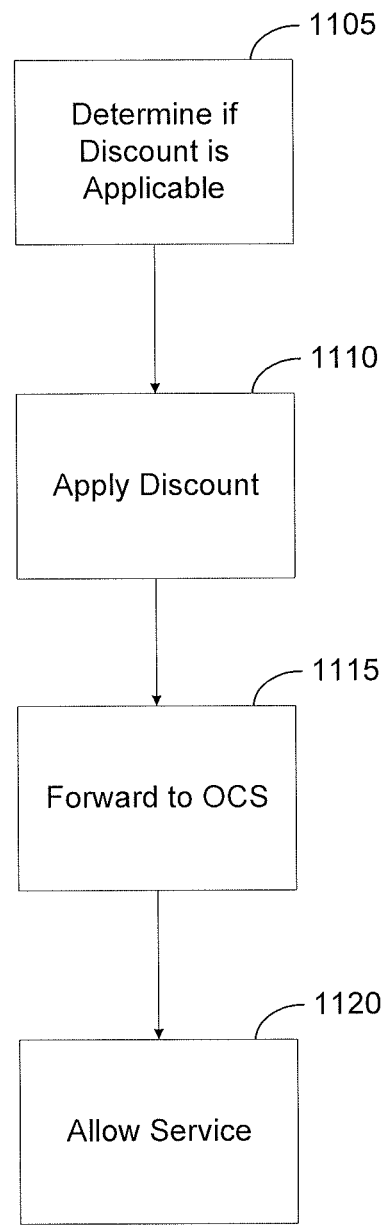

The service level policies defined in the Service Authorization and Utilization Control Function are bound to a given subscriber based on the NAI. The NAI is used in the SAUCF to bind subscribers to service policy rules associated with this subscriber. Further, each NAI in the SAUCF is also bound to a set of public-identities (aliases) associated with this subscriber as shown in FIG. 7. The following minimal aliases are defined but are not exhaustive SIP-URI, MDN, MIN, Email Address, and Instant Message Address.

Each subscriber in the SAUCF is bound to a "trusted group" of subscribers defined in FIG. 7. Each subscriber is also identified via NAIs and aliases. Service policy rules govern the binding between a given subscriber and the trusted group as shown in FIG. 7. In a step 3 (635) of FIG. 6 the SAUCF using the NAI for this subscriber, retrieves his/her aliases and also other aliases of the trusted group. The SAUCF then proceeds to apply the service policy rules 620.

FIG. 7 illustrates that each subscriber is bound to a "trusted group" of subscribers. Each subscriber is also identified via NAIs and aliases. Service policy rules govern the binding between a given subscriber and the trusted group. For example, a trusted group 710 may be the mother 715 and father 720 of a subscriber group. A son 705 is bound by the service rules imposed by the mother 715 and father 720. An exemplary service rule may be that the son may only call mother and father and no one else. Thus, if the son 705 requests to call another person, then the SAUCF implements the service rule and denies the request to the son.

FIGS. 8-11 are flow charts that illustrate an exemplary application of service policy rules. A first set of steps may be to apply communication service rules. For example, a son may be restricted to call only his parents. Consequently, at a first step 805, a SAUCF may match the Target NAI against the Subscriber Trusted Group (parents) NAIs. If a match is not found then service access is denied 820 as shown in step 4.b 645 in FIG. 6. If a match is found, then the SAUCF may match the allowed communication times by the requesting subscriber with the requesting time of the subscriber at a step 810. If a match is not found then service access is denied 820 as shown in step 4.b 645 in FIG. 6. For example, if the requesting subscriber is a son who is calling his mother at 3 pm but is only allowed to call his parents between 5 pm and 7 pm, then service access is denied to him. At a next step 815, a SAUCF matches the requested content against the disallowed content for the subscriber. If a match is found (content disallowed) then service access is denied 820 as shown in step 4.b 645 in FIG. 6. For example, if a subscriber requests streaming video from a particular website, and the trusted group has assigned the particular website as disallowed content, and then the subscriber is denied service 820. However, if a match is not found, the SAUCF may continue by applying Security and Privacy Service rules 825.

At a next step 905, the SAUCF determines whether to apply Security and Privacy rules based on whether a Privacy Request AVP is present (See Table 1). It may then match the Location, Presence, or Identity parameter against the setting for the subscriber's trusted group. If a match is found then service access is denied 920 as shown in step 4.b 645 in FIG. 6. Next, the SAUCF may apply Service Authorization and Utilization rules. At a next step 910, the SAUCF matches the Service ID against the Service ID allowed for the subscriber. If a match is found and the Target Service Content parameter is present (See Table 1), then the SAUCF matches the Target Service Content against the disallowed content for the subscriber at a next step 915. If a match is found then service access is denied 920 as shown in step 4.b 645 in FIG. 6. However, if a match is not found the SAUCF may continue to apply further service authorization and utilization rules 925.

Figure 12:
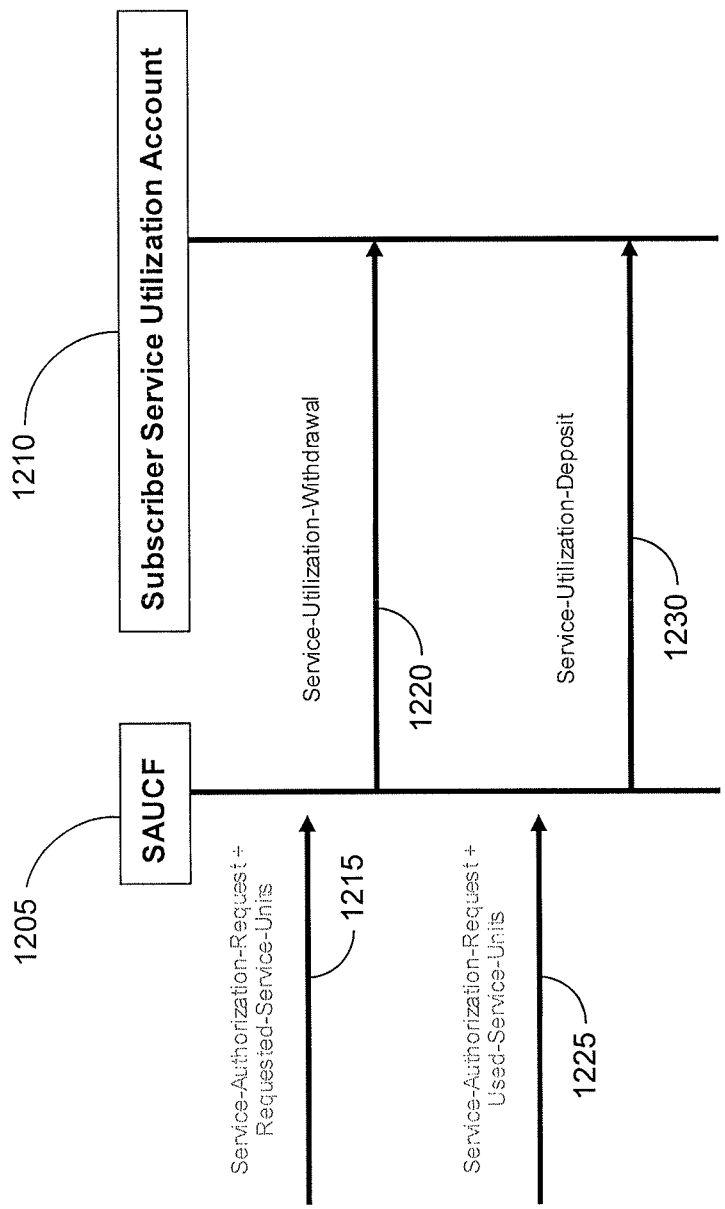
FIG. 12 is an exemplary message flow diagram that illustrates the mapping of SAUCF messages to Real Time Utilization (Ru) interface messages.

A set of steps 1005-1025 apply further exemplary service authorization and utilization rules. At a next step 1005, the SAUCF applies service utilization bonuses if it determines that the subscriber has not exceeded its service utilization quota. For example, if a Charging Request is present and a Charged Service ID does not match the Service ID, then the SAUCF checks if the Requested-Service-Units parameter (See Table 1) is present and a charge discount is applicable. If so, then a bonus is applied. Note that checking whether the Charging Request is present and a Charged Service ID does not match the Service ID shows that the SAUCF is a proxy for the OCS and that any charging requests are handled by the OCS. Further, it ensures that the "Subscriber Service Utilization Account" is accessed by either the SAUCF or the OCS but not both. At a next step 1010, if the Requested Service Units or Used Service Unit AVP are present (See Table 1) then they are mapped to the Ru interface as shown in FIG. 12 to send to the Subscriber Service Utilization Account. At a next step 1015, the SAUCF determines whether the Subscriber Service Utilization Account can satisfy the requested service.

If not, then the requested service is denied 1020. If so, then the SAUCF may apply "Trusted Group" charge service rules 1025.

A set of steps 1105-1120 implement exemplary "Trusted Group" charge service rules. At a next step 1105, the SAUCF determines whether a "Trusted Group" charge discount is applicable. At a next step 1110, the SAUCF then applies the discount. At a next step 1115, the request message is forwarded to the OCS. At a next step 1125, the service is allowed as shown in Step 4.*a* (640) in FIG. 7.

As discussed previously, the Ru (Real Time Utilization) interface is a modified Diameter application that allows network elements to query the service usage credit balance (held in a network element called the "Subscriber Service Utilization Account") for a given subscriber, and provide the ability to withdraw and deposit into the balance. The "Subscriber Service Utilization Account" allows definition of service utilization "buckets" based on "bundled services". For instance, a "message bundled service" bucket for a subscriber has messages defined as MMS and SMS.

The table below describes a modified set of Diameter AVP commands that may be supported by the Real Time Service Utilization Diameter application.

as a Service Utilization Withdrawal message 1220 to the Subscriber Service Utilization Account 1210. Another example is that a Service Authorization Request and a Used Service Units message 1225 received by the SAUCF are mapped to the Ru interface as a Service Utilization Deposit message 1230 to the Subscriber Service Utilization Account 1210.

Figure 13:
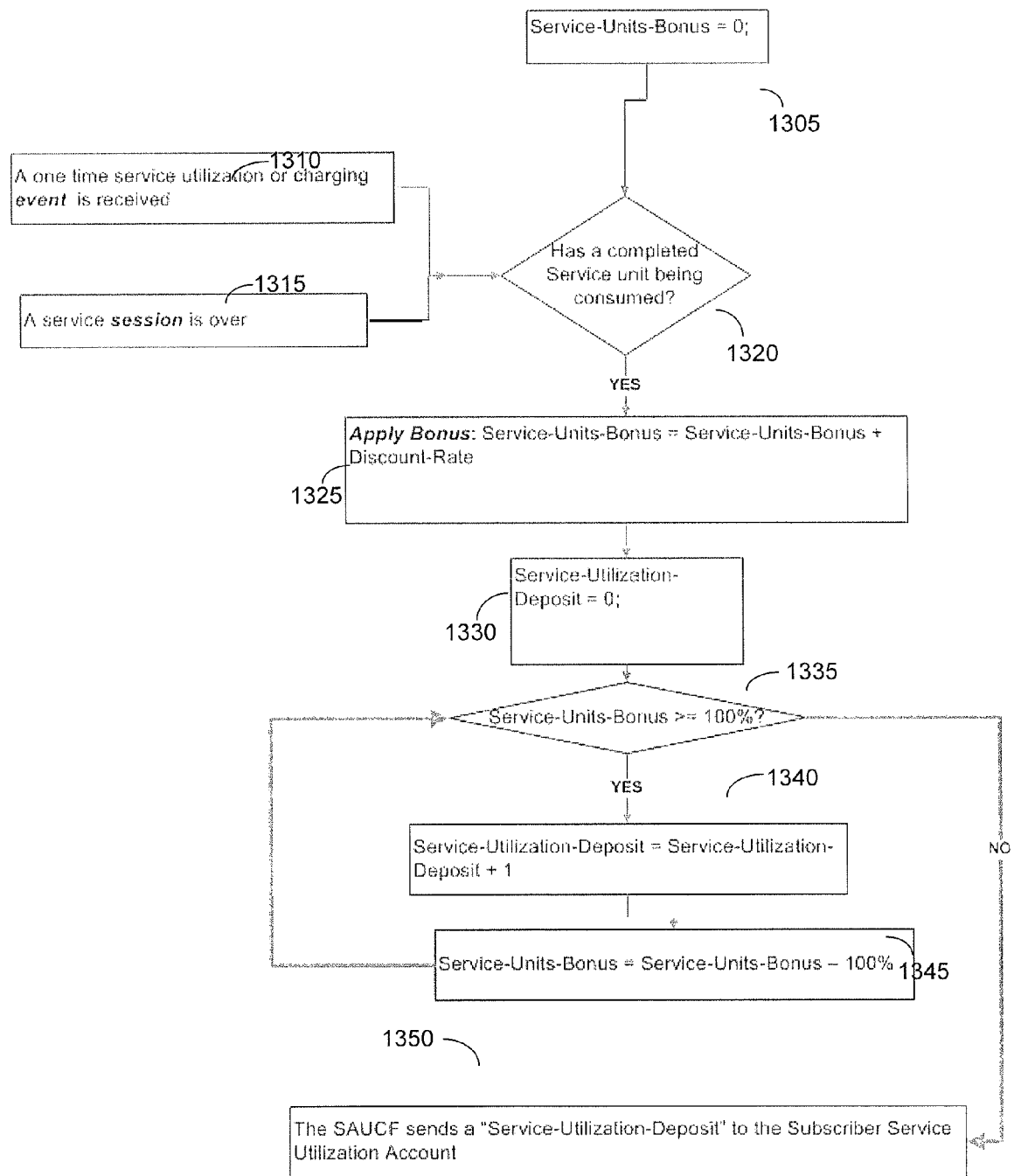
FIG. 13 is a flow chart illustrating an exemplary application of service utilization bonuses.

FIG. 13 is a flow chart illustrating an exemplary application of service utilization bonuses. Discounts may be defined in the SAUCF as part of the charging rules. Discounts in the SAUCF apply both to the price of the service as well as the number of units utilized for that service. For the number of units utilized for that service the discount becomes a cumulative bonus. For example, sending an MMS message may cost 10 cents and sending MMS messages to members of the family produces a 50% discount. Then sending the first MMS message costs 5 cents and sending the second also costs 5 cents but the subscriber has gained an additional MMS message as a bonus. That is, the subscriber sent two MMS messages but consumed only one. Note that the SAUCF accumulates bonuses on a per service basis. So if the 50% discount continues to apply and the subscriber sends 2 MMS messages and 2 SMS messages than the subscriber will only have

TABLE 2

| Command Name | Parameters | Description |
| --- | --- | --- |
| Service-Utilization-Query | | This command queries the balance of the subscriber utilization account. The response is the number of units available for the requestor for this Service-ID. |
| | Service-ID | ID identifying the specific service for which balance query is being requested. Example: MMS, LBS, PTT, etc. |
| | Requestor | Identity of source of this request. The identity may be: SIP-URI, MDN, MN, Email-Address, IM Address, and NAI. |
| Service-Utilization-Withdrawal | | This command request a service unit balance withdrawal from this subscriber's utilization account. The response is the number of units granted for this request. |
| | Service-ID | ID identifying the specific service for which a balance service unit withdrawal is being requested. Example: MMS, LBS, PTT, etc. |
| | Requestor | Identity of source of this request. The identity may be: SIP-URI, MDN, MIN, Email-Address, IM Address, and NAI. |
| | Service-Units-Withdrawn | The number of service units to be withdrawn from the subscriber's utilization account |
| Service-Utilization-Deposit | | This command requests a service unit deposit to the balance of this subscriber's utilization account. |
| | Service-ID | ID identifying the specific service for which a balance service unit deposit is being requested. Example: MMS, LBS, PTT, etc. |
| | Requestor | Identity of source of this request. The identity may be: SIP-URI, MDN, MIN, Email-Address, IM Address, and NAI. |
| | Service-Units-Deposited | The number of service units to be deposited into the subscriber's utilization account |

FIG. 12 shows the service utilization messages received by the SAUCF are mapped to the Ru Interface. The Ru interface is between the SAUCF 1205 and the Subscriber Service Utilization Account 1210. For example, a Service Authorization Request and a Requested Service Units message 1215 received by the SAUCF 1205 are mapped to the Ru interface consumed one MMS and one SMS messages, respectively. The SAUCF may need to maintain a per-subscriber, per-service counter called a Service-Units-Bonus to support the cumulative bonus for service unit discounts as shown in FIG. 13. At a step 1305. a Service-Units-Bonus counter is initialized with a value of zero (0%) units for this subscriber for this service. Each time a service unit is consumed the discount is applied. A service unit may be considered consumed when a one time service utilization or charging event is received (1310) or when a service session is over (1315). Thus, at a step 1302, the SAUCF determines whether a completed service unit has been consumed. If so then it applies the bonus at a step 1325, for example, Service-Units-Bonus=Service-Units-Bonus+Discount-Rate. At a step 1330 the SAUCF sets the value of "Service-Utilization-Deposit" to zero. At a step 1335 the SAUCF determines whether Service-Units-Bonus greater than or equal to 100%. If so, then at a step 1340 value of "Service-Utilization-Deposit" is incremented by 1 unit. At step 1345, Service-Units-Bonus=Service-Units-Bonus−100%. However, if Service-Units-Bonus is less than 100%, then the SAUCF sends a "Service-Utilization-Deposit" to the Subscriber Service Utilization Account at step 1350.

A service unit is consumed when a one time service utilization or charging event occurs or when a service session is over. A one time service utilization or charging event may be the following: (a) A Service-Authorization-Request AVP with a Requested-Service-Units AVP is received by the SAUCF and the unit-type is (a) One-Time-Event; or (b) A Credit Control (RFC4006) request with "Event-Request" AVP is received. A service session is over when the following occurs: (a) the SAUCF keeps track of units consumed for Service-Authorization-Requests by tracking the "Granted-Service-Units" returned by the Subscriber Service Utilization Account; (b) the SAUCF keeps track of chargeable consumed units by tracking the "Granted-Units" returned by the On Line Charging System; (c) a service session is over when a Service-Authorization-Request AVP with a Requested-Service-Units AVP is received by the SAUCF and the unit-type is Final-Request and "Used-Service-Units" AVP; and (d) a chargeable service session is over when a Credit Control message is received with a request type of "Terminate" and Used-Units. Note that time constraints may also be included in the calculation of the discount. For example, time constraints may indicate when discounts apply.

The SAUCF may also apply charging discounts to a subscriber for being a member of Trusted Groups. The SAUCF may apply special discounts that cover multiple services tied to certain communication constraints such as the constraint of communication within a "trusted group". This is not possible by utilizing an On Line Charging System (OCS) alone. An exemplary application of Trusted-Group discounts may be that the SAUCF on receipt of a Charge-Request AVP may do the following: (1) retrieve the price for this service from the OCS; (2) send a Credit Control message with Price-Inquiry AVP to the OCS for this Charged-Service-ID; (3) apply the Trusted-Group discount for this subscriber using price returned in the Credit Control Answer message; (4) Compute Discount=Service Price*Trusted Group Discount Rate; and (5) send a Credit Control message with Refund AVP which reflects the Discount:

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of managing mobile network services, the method comprising:
   receiving, by a node, via an electronic network, a mobile network service request, the mobile network service request requesting authorization by a service authorization and utilization control function (SAUCF) element executing on the node and acting as a service manager configured to centrally coordinate service authorizations for multiple network services associated with an individual subscriber account by evaluating a service policy for the subscriber account, the service policy defining user access spanning the multiple network services grouped into a plurality of bundled service categories;
   receiving configuration of the service policy for a subscriber group within a mobile network by one or more subscribers within the subscriber group;
   storing available service credits within a subscriber service utilization account based on the service policy;
   implementing, by the SAUCF element, the service policy via an interface configured to apply the service policy to a bundled service category corresponding to the mobile network service request;
   electronically processing, via the SAUCF element, the authorization for the mobile network service request based on the service policy, the service policy comprising:
   (a) communication authorization controls affecting permission for a user associated with the subscriber account to access a mobile network service identified in the mobile network service request in accordance with one or more criteria applicable to the bundled service category corresponding to the mobile network service, and
   (b) charging controls for determining whether a subscriber account includes sufficient credits to use the mobile network service within the corresponding bundled service category.

2. The method according to claim 1, the method further comprising:
mapping messages received by the SAUCF element across an application interface from a network element to a real time utilization interface;
transmitting mapped messages across the real time utilization interface from the SAUCF element to a subscriber service utilization account;
receiving messages across the real time utilization interface from the subscriber service utilization account to the SAUCF element.

3. The method according to claim 2, wherein the messages are based on an application interface incorporating Attribute Value Pair commands.

4. The method according to claim 2, wherein the messages across a real time utilization interface are based on an application incorporating Attribute Value Pair commands.

5. The method according to claim 1, the method further comprising applying service bonuses to qualified subscribers.

6. The method according to claim 1, wherein the electronic network is selected from a group consisting of: an IMS network, a non-IMS network, a legacy network, an access network, and Internet.

7. The method according to claim 1, wherein the mobile network service is selected from a group consisting of: streaming video, MMS, SMS, a parental control service, a mobile advertisement, Web browsing, Location, Presence, PoC, VOIP, PTT, an advertising service, an advertising control service, a subscriber privacy service, and a family charging service.

8. A system for managing mobile network services in a mobile network, the system comprising:
a service authorization and utilization control function (SAUCF) element executing on a network node, the SAUCF element being configured to authorize a mobile network service request by acting as a service manager configured to centrally coordinate service authorizations for multiple network services associated with an individual subscriber account by evaluating a service policy for the subscriber account, the service policy defining user access spanning the multiple network services grouped into a plurality of bundled service categories, the service policy comprising:
(a) communication authorization controls affecting permission for a user associated with the subscriber account to access a mobile network service identified in the mobile network service request in accordance with one or more criteria applicable to a bundled service category corresponding to the mobile network service; and
(b) charging controls for determining whether a subscriber account includes sufficient credits to use the mobile network service within the corresponding bundled service category;
an interface coupled to the SAUCF element and configured to apply the service policy to the bundled service category corresponding to the mobile network service;
wherein the mobile network is configured to provide the mobile network service to a subscriber mobile device adapted to request the mobile network service; and
an Access Gateway that receives and transmits service packets from a core network to the subscriber mobile device.

9. The system according to claim 8, the system further comprising:
a serving call/session control function that performs session control as a Session Initiation Protocol server;
a proxy call/session control function that provides authentication functions and acts as a Session Initiation Protocol proxy server;
a Home Subscriber Server that is a database for data necessary for authentication and authorizing mobile network services; and
a Policy Function that allocates network resources to provide the mobile network service.

10. The system according to claim 8, wherein the network is selected from a group consisting of: an IMS network, a non-IMS network, a legacy network, an access network, and Internet.

11. The system according to claim 8, wherein the mobile network service is selected from a group consisting of: streaming video, MMS, SMS, a parental control service, a mobile advertisement, Web browsing, Location, Presence, PoC, VOIP, PTT, an advertising service, an advertising control service, a subscriber privacy service, and a family charging service.

12. The system according to claim 8, wherein the subscriber mobile device is selected from a group consisting of: a mobile phone, a Personal Digital Assistant, and a portable computer.

13. An apparatus for managing a mobile network service in a mobile network, the apparatus comprising:
a service authorization and utilization control function (SAUCF) element executing on a network node, the SAUCF element being configured to authorize a mobile network service request by acting as a service manager configured to centrally coordinate service authorizations for multiple network services associated with an individual subscriber account by evaluating a service policy for the subscriber account, the service policy defining user access spanning the multiple network services grouped into a plurality of bundled service categories, the service policy comprising:
(a) communication authorization controls affecting permission for a user associated with the subscriber account to access a mobile network service identified in the mobile network service request in accordance with one or more criteria applicable to a bundled service category corresponding to the mobile network service; and
(b) charging controls for determining whether a subscriber account includes sufficient credits to use the mobile network service within the corresponding bundled service category; and
an interface coupled to the SAUCF element and configured to apply the service policy to the bundled service category corresponding to the mobile network service;
wherein the service policy further comprises privacy controls affecting disclosure of subscriber information in connection with the requested mobile network service.

14. The apparatus according to claim 13, wherein communication authorization controls are selected from the group consisting of: destination, time, usage, and content.

15. The apparatus according to claim 13, wherein the application interface that carries messages between the service authorization and utilization control function and the network elements is based on Attribute Value Pair commands.

16. The apparatus according to claim 13, wherein a real time utilization interface transmits messages between the service authorization utilization and control function and the subscriber service utilization account is based on Attribute Value Pair commands.

17. The apparatus according to claim 13 wherein the mobile network service is selected from a group consisting of streaming video, MMS, SMS, a parental control service, a mobile advertisement, Web browsing, Location, Presence, PoC, VOIP, PTT, an advertising service, an advertising control service, a subscriber privacy service, and a family charging service.

* * * * *